United States Patent
Oh et al.

(10) Patent No.: US 7,084,933 B2
(45) Date of Patent: Aug. 1, 2006

(54) TOUCH PANEL FOR DISPLAY DEVICE

(75) Inventors: Eui Yeol Oh, Yongin-shi (KR); Hee Jung Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 174 days.

(21) Appl. No.: 10/702,487

(22) Filed: Nov. 7, 2003

(65) Prior Publication Data

US 2004/0105040 A1    Jun. 3, 2004

(30) Foreign Application Priority Data

Nov. 14, 2002    (KR)    ............... 10-2002-0070792

(51) Int. Cl.
*G02F 1/133*    (2006.01)
*G09G 5/00*    (2006.01)

(52) U.S. Cl. .................. 349/12; 349/58; 349/122; 178/18.03; 345/173

(58) Field of Classification Search .......... 349/12, 349/58, 96, 122, 137, 138; 345/173–175, 345/179; 178/18.01, 18.03, 18.05–18, 18.11, 178/19.01, 19.03–19
See application file for complete search history.

(56) References Cited

U.S. PATENT DOCUMENTS

| 5,220,324 | A | 6/1993 | Morita | |
|---|---|---|---|---|
| 6,417,846 | B1 | 7/2002 | Lee | |
| 6,754,069 | B1* | 6/2004 | Harada | 361/681 |
| 2002/0130849 | A1* | 9/2002 | Ahn et al. | 345/173 |
| 2004/0189587 | A1* | 9/2004 | Jung et al. | 345/102 |
| 2005/0190161 | A1* | 9/2005 | Hong et al. | 345/173 |

FOREIGN PATENT DOCUMENTS

WO    WO 02/075438 A1    9/2002
WO    WO 02/084876 A1    10/2002

OTHER PUBLICATIONS

IBM Technical Disclosure Bulletin UK—Issue No. 427, p. 1538—Nov. 1, 1999.*

* cited by examiner

*Primary Examiner*—Toan Ton
*Assistant Examiner*—Tai Duong
(74) *Attorney, Agent, or Firm*—McKenna Long & Aldridge LLP

(57) ABSTRACT

A touch panel for a display device integrates functionality provided by capacitive-type and EM-type touch panels. The touch panel is integrated with the display device and includes a capacitive-type touch panel arranged above the display device and an EM-type touch panel arranged below the display device.

32 Claims, 6 Drawing Sheets

TOUCH PANEL FOR DISPLAY DEVICE

This application claims the benefit of the Korean Application No. P2002-70792 filed on Nov. 14, 2002, which is hereby incorporated by reference for all purposes as if fully set forth herein.

BACKGROUND OF THE INVENTION

1. Field of the Invention

The present invention relates to touch panels for display devices. More particularly, the present invention relates to combination capacitive-type and electromagnetic type touch panels for display devices.

2. Discussion of the Related Art

Touch panels have been developed as a means of efficiently interfacing with electronic devices via a display surface. For example, users may input desired information using a touch panel integrated with a display device while watching images displayed by the display device. Allowing users to input desired information to an electronic device via a display surface, touch panels substantially reduce or eliminate the need for other types of input devices (e.g., keyboards, mice, remote controllers, and the like). Currently, touch panels have been widely integrated with display surfaces of flat panel display devices such as liquid crystal display (LCD) devices, plasma display panel (PDP) devices, electroluminescence (EL) devices, and cathode ray tubes (CRTs).

Depending on the type of contact object used (e.g., a user's finger, a stylus, etc.), and depending on the manner in which the location of a contact point (i.e., the location where the contact object is operably proximate the touch panel) is determined, touch panels are generally classifiable as analog resistive-type, capacitive-type, electromagnetic (EM)-type, saw-type, and infrared-type touch panels.

Generally, analog resistive-type touch panels include an upper transparent substrate supporting an upper electrode and a lower transparent substrate supporting a lower electrode. The upper and lower transparent substrates are attached to each other but spaced apart from each other by a predetermined distance. When a surface of the upper transparent substrate is contacted by a contact object, an upper electrode formed on the upper transparent substrate electrically contacts a lower electrode formed on the lower transparent substrate. When the upper and lower electrodes electrically contact each other, a voltage, made variable by a resistance value or a capacitance value specific to the location of where the contact object contacted the touch panel (i.e., the contact point), is then detected and outputted along with a location defined by coordinates of the contact point.

Generally, capacitive-type touch panels include a transparent electrode formed on a display device such as an LCD panel, wherein a voltage is applied to each corner or side of the transparent electrode and a uniform electric field is thereby generated within the transparent electrode. Coordinates of the contact point are determined in accordance with a voltage drop generated when the user touches the touch panel via the contact object.

FIG. 1 illustrates a schematic view of a related art electromagnetic (EM)-type touch panel for a display device.

Electromagnetic (EM)-type touch panels generally determine coordinates of a contact point by detecting an electromagnetic field resonance. Recently, related art EM-type touch panels have been integrated with Tablet PCs, capable of displaying high-quality images.

Referring to FIG. 1, a related art EM-type touch panel is integrated with a display device such as an LCD device, wherein the LCD device includes an LCD panel 11, an upper polarizing plate 12, a lower polarizing plate 13, a backlight 14, a passivation layer 15, an EM-type touch panel, and a case top 17.

The LCD panel 11 is capable of displaying images in accordance with externally input driving and video signals and includes upper and lower substrates bonded to each other and spaced apart from each other by a predetermined distance, wherein liquid crystal material is injected between the upper and lower substrates. The upper polarizing plate 12 is arranged over the LCD panel 11 and the lower polarizing plate 13 is arranged beneath the LCD panel 11 to selectively polarize light irradiated by the backlight 14 into the LCD panel 11 as well as emitted light transmitted by the LCD panel 11. Arranged above and spaced apart from the upper polarizing plate 12, the passivation layer 15 serves as a dielectric layer as well as protects the LCD panel 11 from a proximately arranged stylus pen 23, as will be discussed in greater detail below. The EM-type touch panel 16 is arranged below the LCD panel 11 and outputs a variable voltage in accordance with a location of the contact point on the touch panel. The case top 17 is provided as a metal material that secures the backlight 14, the LCD panel 11, and the EM-type touch panel 16 together as a single body.

The EM-type touch panel 16 includes a sensor board 22 having a sensor PCB 18, a shield plate 19, and a connector 21 to generate electromagnetic fields; and a control board 25 having a microprocessor 24 for transmitting signals to the sensor board 22 and for detecting coordinates of contact point generated by a stylus pen 23 by detecting input signals generated by the stylus pen 23, wherein the stylus pen 23 includes a resonance circuit 26 having a coil and a capacitor. The electromagnetic field generated from the sensor board 22 is stored in the resonance circuit 26 of the stylus pen 23 for a predetermined amount of time.

During operation of the related art EM-type touch panel shown in FIG. 1, a control signal is generated by the control board 25 which, in turn, enables the sensor board 22 to generate an electromagnetic field. Subsequently, a current is induced within a stylus pen 23 arranged within the generated electromagnetic field, wherein the induced current has a resonant frequency and is stored for a predetermined amount of time in accordance with an LC value of the resonance circuit 26. The sensor board 22 then detects the induced current stored within the resonance circuit 26 and transmits a corresponding signal to the control board 25 whereby the control board 25 determines the location of the contact point generated by the stylus pen 23.

The resonance circuit 26 is provided as an LRC circuit, wherein the amplitude of the induced current varies with the frequency of an applied power source. The amplitude of the induced current is maximized at a predetermined resonance frequency (f) of the applied power source. More specifically, the resonance frequency (f) is determined by the following equation:

$$f = (2\pi\sqrt{LC})^{-1}$$ (L is an inductance value of an inductor, and C is a capacitance value of a capacitor).

As can be seen from the above discussion, related art EM-type touch panels determine the contact point of a stylus pen using the resonance frequency of transmitted electromagnetic fields, thereby detecting contact points according to a completely different method capacitive-type touch panels use to detect contact points. Further, contact objects, such as a user's finger, do not affect the operation of related art EM-type touch panels. Because the stylus pen is arranged within the generated electromagnetic field, the location of the stylus pen relative to the EM-type touch panel can be detected even when it is above the passivation layer so that hovering and variable pressure effects can be differentiated. EM-type touch panels, therefore, are commonly designed for use in settings such as conferences, seminars, etc., to eliminate the number of potential contact objects from disturbing the EM-type touch panel. The related art EM-type touch panel, however, has a complex circuit structure and is difficult to integrate with existing liquid crystal display modules (LCMs). Moreover, related art EM-type touch panels respond only to corresponding stylus pens, thereby making it difficult apply EM-type touch panels for use in certain applications (e.g., industrial fields). Lastly, if a contact object such as a user's finger contacts the related art EM-type touch panel, no contact points are detected. Accordingly, if a stylus pen becomes lost or damaged, the EM-type touch panel becomes inoperable until a new stylus pen is provided.

SUMMARY OF THE INVENTION

Accordingly, the present invention is directed to a touch panel for a display device that substantially obviates one or more of the problems due to limitations and disadvantages of the related art.

An advantage of the present invention provides a touch panel for a display device, wherein benefits of capacitive-type and EM-type touch panels are integrated into a single system, wherein the touch panel may be operable even if a stylus is lost or damaged.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a touch panel for a display device may, for example, include a display device for displaying an image; a capacitive-type touch panel arranged above the display device; and an EM-type touch panel arranged below the display device.

In one aspect of the present invention, the capacitive-type touch panel is arranged a predetermined distance above the display device.

In another aspect of the present invention, the capacitive-type touch panel may, for example, include a transparent electrode; metal electrodes arranged at corners of the transparent electrode; and a passivation layer arranged over the entire surface of the transparent electrode including the metal electrodes.

In still another aspect of the present invention, the EM-type touch panel may, for example, include a sensor board arranged below the display device, wherein an electromagnetic field is generatable by the sensor board; and a control board arranged below the sensor board, wherein the a signal is transmittable from the control board to the sensor board and wherein coordinates of a contact point on the EM-type touch panel generated by a stylus pen are detectable upon reading an input signal.

In yet another aspect of the present invention, the control board may, for example, include a first driving part capable of detecting a capacitance and driving the capacitive-type touch panel; a second driving part capable of detecting an electromagnetic field and driving the EM-type touch panel; and a switching part for selectively driving the first driving part and the second driving part.

In still a further aspect of the present invention, the transparent electrode may be formed of ITO or TAO material.

In yet a further aspect of the present invention, the metal electrodes may be formed of a mixture of silver and glass, or may be formed of a conductive metal.

In still a further aspect of the present invention, the sensor board may, for example, include a sensor PCB, a shield plate, and a connector.

In yet another aspect of the present invention, the sensor PCB may be connected to the shield plate via an adhesive.

In still another aspect of the present invention, the display device may be provided as an LCD device, wherein the LCD device may, for example, include an LCD panel having lower and upper substrates bonded to each other, and a liquid crystal layer arranged between the lower and upper substrates; lower and upper polarizing plates respectively adhering to lower surface and upper surfaces of the LCD panel for polarizing light; and a backlight for substantially uniformly emitting light toward the lower surface of the LCD panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

As shown in the FIG., the touch panel according to the principles of the present invention is integrated with a display device such as a liquid crystal display (LCD) device. It will be readily appreciated, however, that the concepts of the present invention may be readily extended to integrate the touch panel with substantially any type of display device such as a Cathode Ray Tube (CRT), Plasma Display Panel (PDP), Electro Luminescent Display (ELD), Vacuum Fluorescent Display (VFD), and the like.

Figure 1:
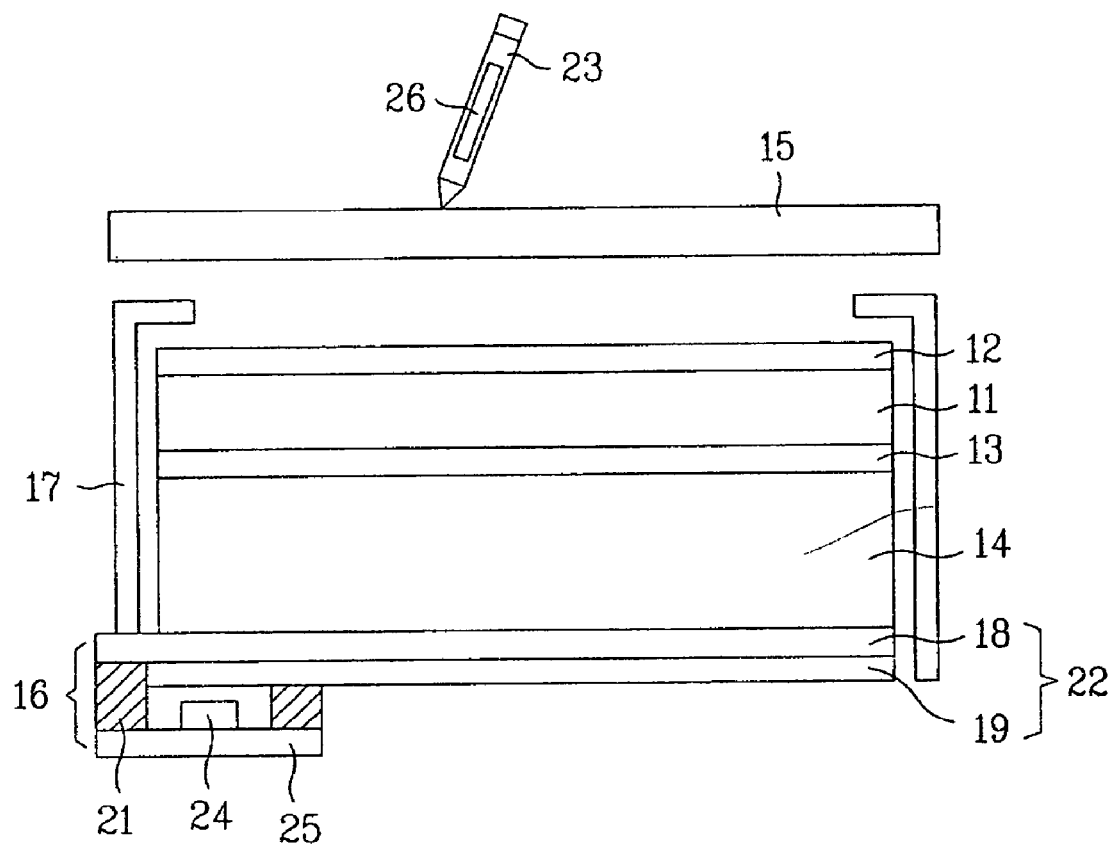
FIG. 1 illustrates a schematic view of a related art electromagnetic (EM)-type touch panel for a display device.
Figure 2A:
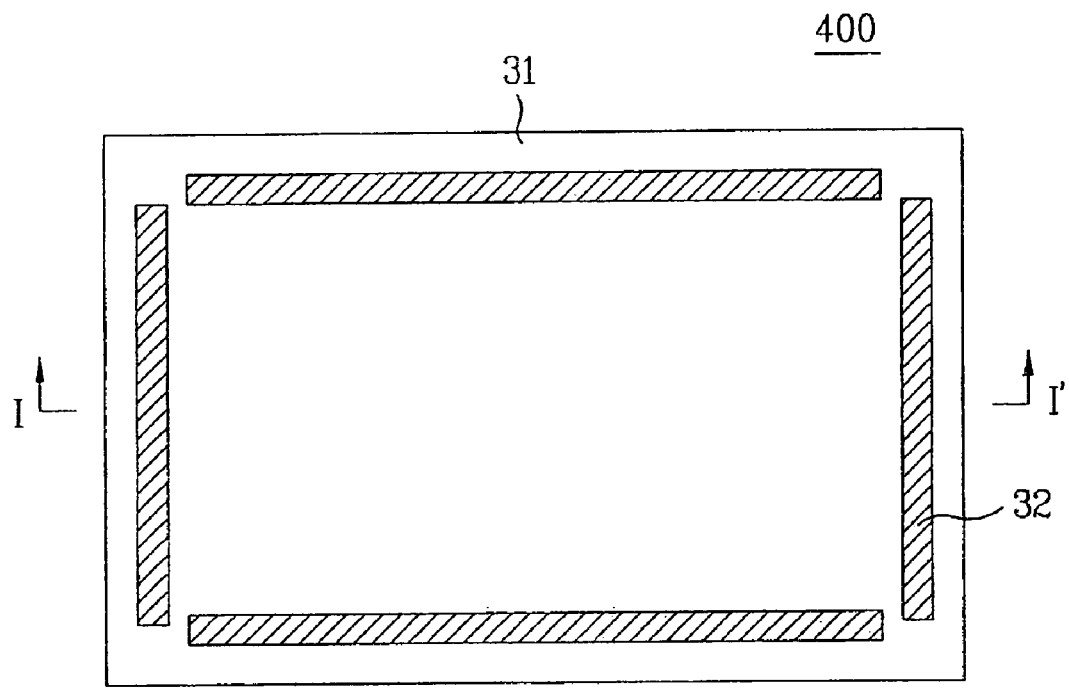
FIG. 2A illustrates a plan view of a capacitive-type touch panel.
Figure 2B:
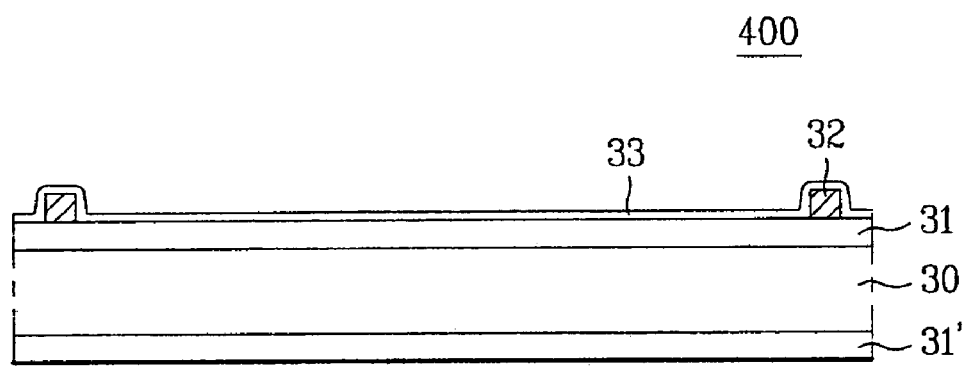
FIG. 2B illustrates a cross-sectional view of a capacitive-type touch panel taken along line I–I' of FIG. 2A.

FIG. 2A illustrates a plan view of a capacitive-type touch panel while FIG. 2B illustrates a cross-sectional view of a capacitive-type touch panel taken along line I–I' of FIG. 2A.

Referring to FIGS. 2A and 2B, a capacitive-type touch panel 400 may, for example, include an insulating substrate 30 having upper and lower surfaces. In one aspect of the present invention, the insulating substrate 30 may, for example, be formed of a material such as glass, quartz, diamond, or the like.

Upper and lower transparent electrodes 31 and 31' may be arranged on the upper and lower surfaces of the insulating substrate 30, respectively. The lower transparent electrode 31' reduce electromagnetic interference introduced by the display device from generating errors in signals transmitted from the capacitive-type touch panel 400. In one aspect of the present invention, the upper and lower transparent electrodes 31 and 31' may, for example, be formed of a material such as Indium-Tin-Oxide (ITO), Tin-Antimony-Oxide (TAO), or the like. According to the principles of the present invention, it may be beneficial to form the upper and lower transparent electrodes 31 and 31' using a material having a relatively high resistance value. Accordingly, it may be beneficial to form the upper and lower transparent electrodes 31 and 31' of a material such as TAO, or the like.

Metal electrodes 32 may be arranged at corners and/or sides of the upper transparent electrode 31 to form a resistive network in the periphery of the upper transparent electrode 31. In one aspect of the present invention, the resistive network may be formed in a linear pattern to substantially uniformly transmit a control signal over the entire surface of the upper transparent electrode 31. In another aspect of the present invention, the metal electrodes 32 may be formed of a conductive metal, a material such as silver, a mixture of silver and glass, or the like. In still another aspect of the present invention, the metal electrodes 32 may be formed, for example, by printing a silkscreen on the upper transparent electrode 31 followed by a thermal process, by depositing conductive material on the upper transparent electrode 31 followed by a patterning process, or the like.

A passivation layer 33 may be arranged over an entire surface of the insulating substrate 30 and directly on the metal electrodes 32 and upper transparent electrode 31. In one aspect of the present invention, the passivation layer 33 may be formed of an insulating material such as silicon nitride, silicon oxide, Benzocyclobutene (BCB), acrylic resin, or the like. In another aspect of the present invention, the passivation layer 33 may serve as a dielectric layer and may prevent a contact object from contacting and damaging the upper transparent electrode 31.

As mentioned above, a voltage applied to the metal electrodes 32 may generate a substantially uniform electric field over the surface of the upper transparent electrode 31, wherein the surface may be curved or flat. According to principles of the present invention, the capacitive-type touch panel 400 may include analog measure circuits (e.g., current sensors) arranged at corners of the touch panel to measure disturbances in the substantially uniform electric field. When a contact object is operably proximate the passivation layer 33 (e.g., either above or in direct contact with the passivation layer 33), some of the current within the generated electric field may be transferred to the contact object, thereby decreasing the current within the electric field. Subsequently, the current sensors may detect the decrease in the charge and, based on the relative differences in the detect current decrease at the corners of the of the touch panel, calculate the position of the contact object with respect to the upper touch panel 400 (i.e., the contact point).

Figure 3:
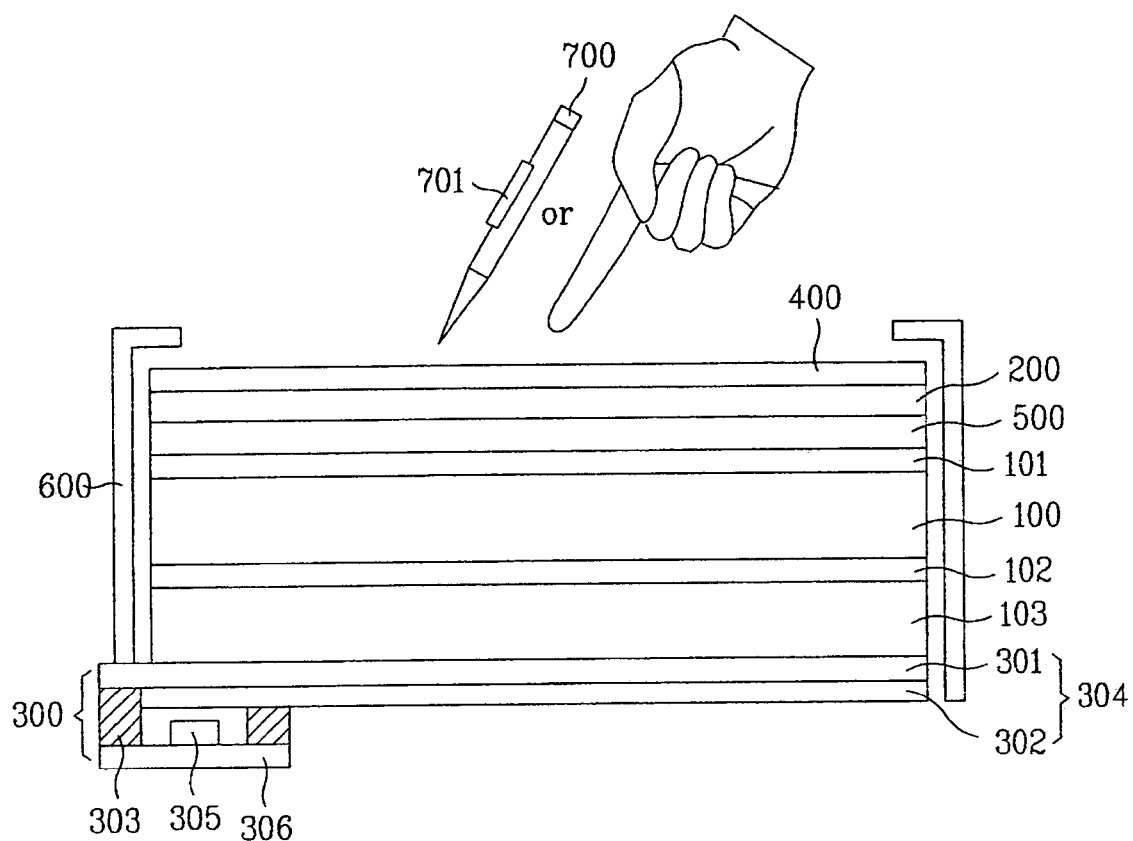
FIG. 3 illustrates a schematic view of a touch panel for a display device according to principles of the present invention.

FIG. 3 illustrates a schematic view of a touch panel integrated with a liquid crystal display (LCD) device according to principles of the present invention.

Referring to FIG. 3, the touch panel according to principles of the present invention may, for example, be integrated with a display device such as a (LCD) device.

The LCD device may, for example, include an LCD panel 100, an upper polarizing plate 101, a lower polarizing plate 102, and a backlight 103. The LCD panel 100 may, for example, be capable of displaying images in accordance with externally input driving and video signals. Moreover, the LCD panel 100 may, for example, include upper and lower substrates bonded to, and spaced apart from, each other by a predetermined distance, wherein liquid crystal material may be provided (e.g., injected, dispensed, etc.) between the upper and lower substrates. The upper polarizing plate 101 may be arranged over the LCD panel 100 and the lower polarizing plate 102 may be arranged beneath the LCD panel 100 to selectively polarize light irradiated by the backlight 103 into the LCD panel 100 as well as emitted light transmitted by the LCD panel 100. In one aspect of the present invention, the touch panel shown in FIG. 3 may, for example, be integrated with a display device of a Tablet PC, or the like.

According to principles of the present invention, the touch panel may, for example, include the aforementioned capacitive-type touch panel 400 (shown above in FIGS. 2A and 2B), a passivation layer 200, and an EM-type touch panel 300. In one aspect of the present invention, the capacitive-type touch panel 400 may be arranged above the passivation layer 200, over the display surface of the display device (e.g., over the LCD panel 100), while the EM-type touch panel 300 may be arranged below the display surface of the display device (e.g., below the LCD panel 100). In one aspect of the present invention, a case top 600 may be provided as a structure capable of securing the LCD device and the touch panel together as a single body. In another aspect of the present invention, the case top may be formed of a material such as metal.

In one aspect of the present invention, the capacitive-type touch panel 400 may be arranged on the passivation layer 200 such that a user may cause the touch panel to generate input signals via a contact object such as a user's finger, etc.

The passivation layer 200 may be formed of a material such as silicon nitride, silicon oxide, BCB, acrylic resin, or the like, and spaced apart from the LCD panel 100 to form a gap 500. Accordingly, the passivation layer 200 may serve as a dielectric layer while protecting the LCD panel 100 from damage induced by contact objects such as a stylus pen, a user's finger, etc.

The EM-type touch panel 300 may, for example, include a sensor board 304 and a control board 306. The sensor board 304 may generate electromagnetic fields and include a sensor PCB 301, a shield plate 302, and a connector 303. In one aspect of the present invention, the sensor PCB 301 may be connected to the shield plate 302 by an adhesive. The control board 306 may be arranged beneath, and be electrically coupled to, the sensor board 304. In one aspect of the present invention, the control board 306 may also be electronically coupled to the capacitive-type touch panel 400. The control board 306 may support a microprocessor 305 that transmits signals to the sensor board 304 and may receive input signals to detect contact points generated by a stylus pen 700. In one aspect of the present invention, control board 306 may also receive input signals to detect contact points generated by contact objects other than the stylus pen 700 (e.g., a user's finger, etc.).

As will be discussed in greater detail below, the stylus pen 700 may, for example, include a coil and a capacitor arranged within a resonance circuit 701. Accordingly, electromagnetic fields generated by the sensor board 304 may be stored within the resonance circuit 701 for a predetermined amount of time.

Figure 4:
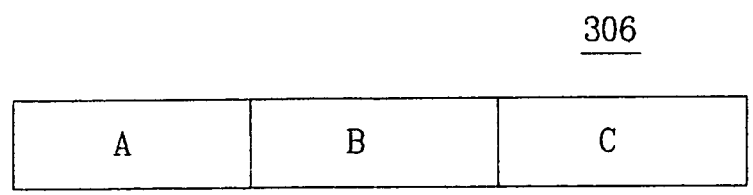
FIG. 4 illustrates a schematic view of the control board shown in FIG. 3.

FIG. 4 illustrates a schematic view of the control board shown in FIG. 3.

Referring to FIG. 4, the control board 306 may be comprised of three driving parts A, B, and C. The first driving part, A, may drive the capacitive-type touch panel 400 and detect capacitance values below 10 pF, generated from users when the surface of the capacitive-type touch panel 400 is contacted by contact objects such as a user's fingers. The second driving part, B, may drive the EM-type touch panel 300 and detect electromagnetic fields generated by the stylus pen 700. The third driving part, C, may switch between the capacitive-type touch panel 400 and the EM-type touch panel 300, enabling either type of touch panel to be driven by their respective driving parts. Accordingly, errors generated when, for example, a user's finger and the stylus 700 simultaneously contact the touch panel may be substantially prevented from occurring because the capacitive-type or EM-type touch panels are individually activated.

When, for example, the EM-type touch panel described above with respect to FIG. 3 is activated and driven via the second and third driving parts B and C, a control signal may be generated by the control board 306 which, in turn, enables the sensor board 304 to generate an electromagnetic field. Subsequently, a current is induced within a stylus pen 700 arranged within the generated electromagnetic field, wherein the induced current has a resonant frequency and is stored for a predetermined amount of time in accordance with an LC value of the resonance circuit 701. The sensor board 304 may then detect the induced current stored within the resonance circuit 701 and transmit a corresponding signal to the control board 306 whereby the control board 306 determines the location of the location of the contact point generated by the stylus pen 700.

According to principles of the present invention, the resonance circuit may comprise an LRC circuit, wherein the amplitude of the induced current may vary with the frequency of the electromagnetic field generated by the sensor board 304. The amplitude of the induced current may be maximized when the frequency of the electromagnetic field generated by the sensor board 304 equals a predetermined, resonance frequency (f) specific to the LC value of the resonance circuit 701. According to principles of the present invention, the resonance frequency (f) may be determined by the following equation:

$f = (2\pi\sqrt{LC})^{-1}$ (L is an inductance value of an inductor, and C is a capacitance value of a capacitor).

When, for example, the capacitive-type touch panel 400 described above with respect to FIGS. 2 and 3, is activated and driven via the first and third driving parts A and C, and upon the contacting the capacitive-type touch panel 400 with a contact object such as a user's finger, a capacitance value below 10 pF is generated and transmitted to the metal electrodes 32 (as shown in FIG. 2), wherein the metal electrodes 32. As the capacitance value transmitted to the metal electrodes 32 is proportional to the distance between the contact point and the various metal electrodes 32, coordinates (e.g., X-Y coordinates) of the contact point may be calculated based on the capacitance value transmitted to the metal electrodes 32 by the microprocessor 305.

Figure 5:
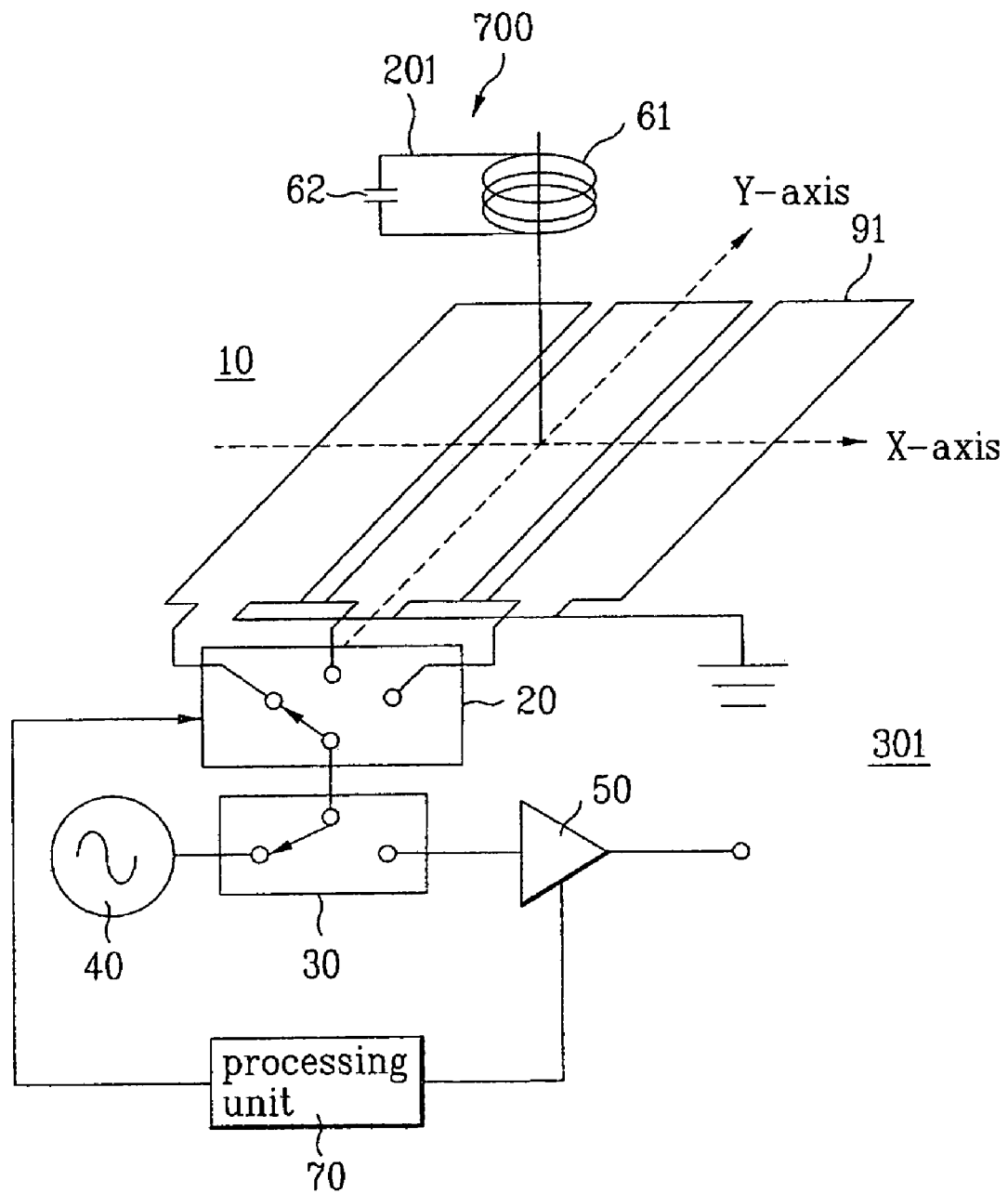
FIG. 5 illustrates a method of detecting coordinates of a contact point of a stylus pen with respect to a sensor board of an EM-type touch panel.

FIG. 5 illustrates a method of detecting coordinates of a contact point generated by a stylus pen.

Referring to FIG. 5, the EM-type touch panel 300 may, for example, include the sensor board 304 having the sensor PCB 301. As mentioned above, the stylus pen 700 includes the resonance circuit 701. In one aspect of the present invention, the resonance circuit 701 may, for example, include an induction coil 61 and a capacitor 62. In another aspect of the present invention, the sensor board may further include a sensor array 10 while the sensor PCB 301 may, for example, include a select circuit 20, a connection switching circuit 30, a transmitting circuit 40, a receiving circuit 50, and a processing unit 70. In another aspect of the present invention, the sensor array 10 may, for example, include a plurality of antenna coils 91 having a plurality of conductors arranged parallel to each other along a first predetermined direction (e.g., the Y-axis). In still another aspect of the present invention, a plurality of antenna coils (not shown) having a plurality of conductors arranged in parallel to each other along a second predetermined direction, perpendicular to the first predetermined direction (e.g., the X-axis) may overlap the plurality of antenna coils 91. In yet another aspect of the present invention each of the plurality of antenna coils 91 may comprise first and second ends, wherein the first end is connected to the select circuit 20 and wherein the second end is connected to a ground voltage source.

According to principles of the present invention, contact points made on the EM-type touch panel may be determined based on the interaction of electromagnetic fields generated between the sensor board 304 and the stylus pen 700. Based on information provided from the processing circuit 70, the select circuit 20 may select one of the plurality of antenna coils 91 arranged along the X- and Y-axes. Subsequently, the connection switching circuit 30 alternately connects the selected antenna coil 91 between the transmitting circuit 40 and the receiving circuit 50. Next, the transmitting circuit 40 may apply an AC signal through the connection switching circuit 30, enabling the sensor board 304 to generate an alternating electromagnetic field which then induces a current within the resonance circuit 701 by virtue of Faraday's law. Subsequently, a signal corresponding to the selected antenna coil 91 may be generated within the resonance circuit 701 and applied sequentially to the select circuit 20, the connection switching circuit 30, and the receiving circuit 50. The aforementioned process may be repeated for each of the plurality of antennal coils 91 such that an X-axis coordinate value of the contact point is determined by the processing unit 70. Moreover, the aforementioned process may be performed for the plurality of antenna coils having the plurality of conductors arranged in parallel to each other along the X-axis such that a Y-axis coordinate value of the contact point may also be determined.

Figure 6:
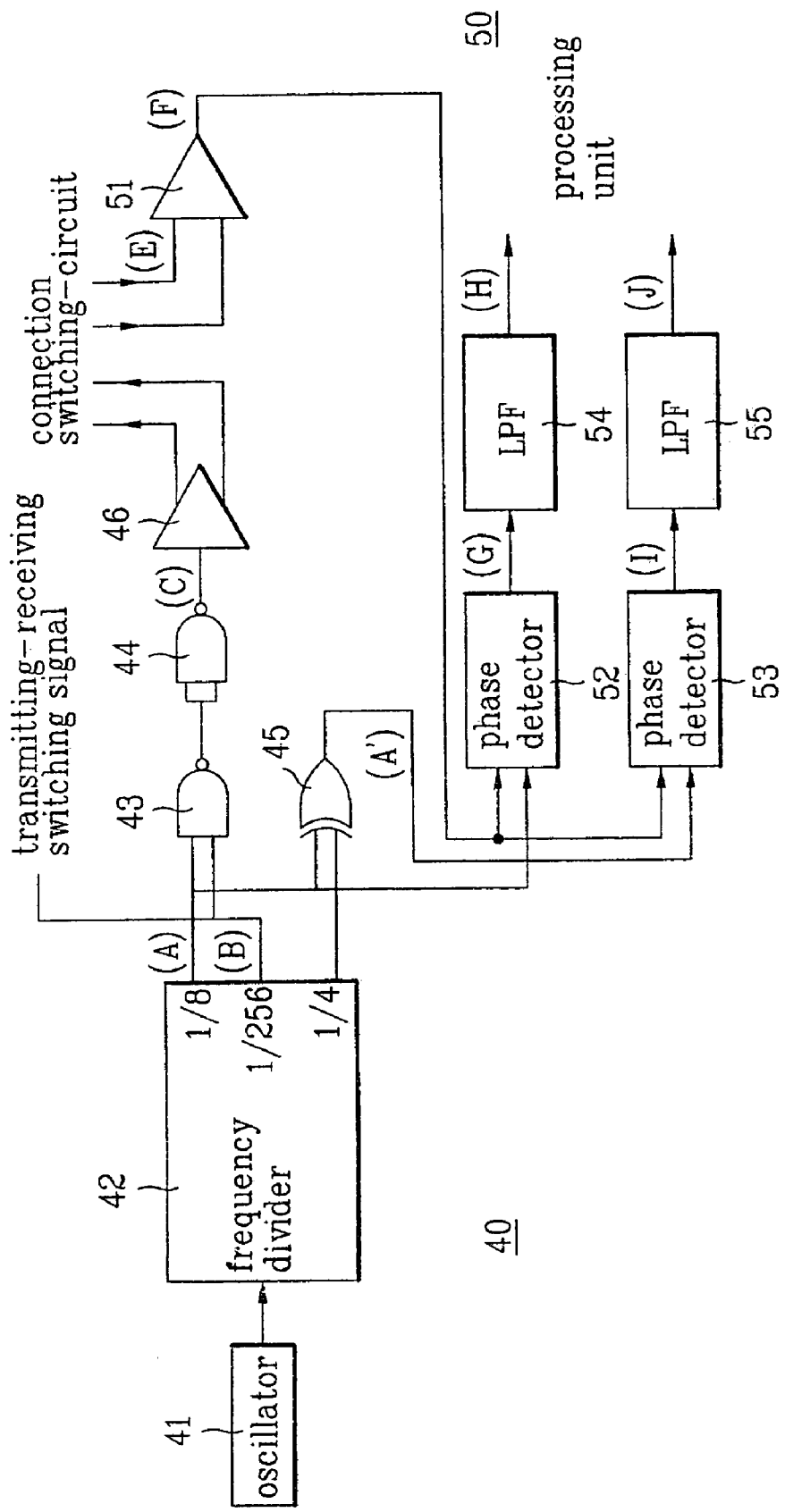
FIG. 6 illustrates the transmitting and receiving circuits shown in FIG. 5.

FIG. 6 illustrates transmitting and receiving circuits shown in FIG. 5.

Referring to FIG. 6, the transmitting circuit 40 may, for example, include an oscillator 41, a frequency divider 42, first and second NAND gates 43 and 44, respectively, an EXOR gate 45, and a driving circuit 46. The receiving circuit 50 may, for example, include an amplifier 51, first and second phase detectors 52 and 53, respectively, and first and second low-pass filters 54 and 55, respectively.

Figure 7:
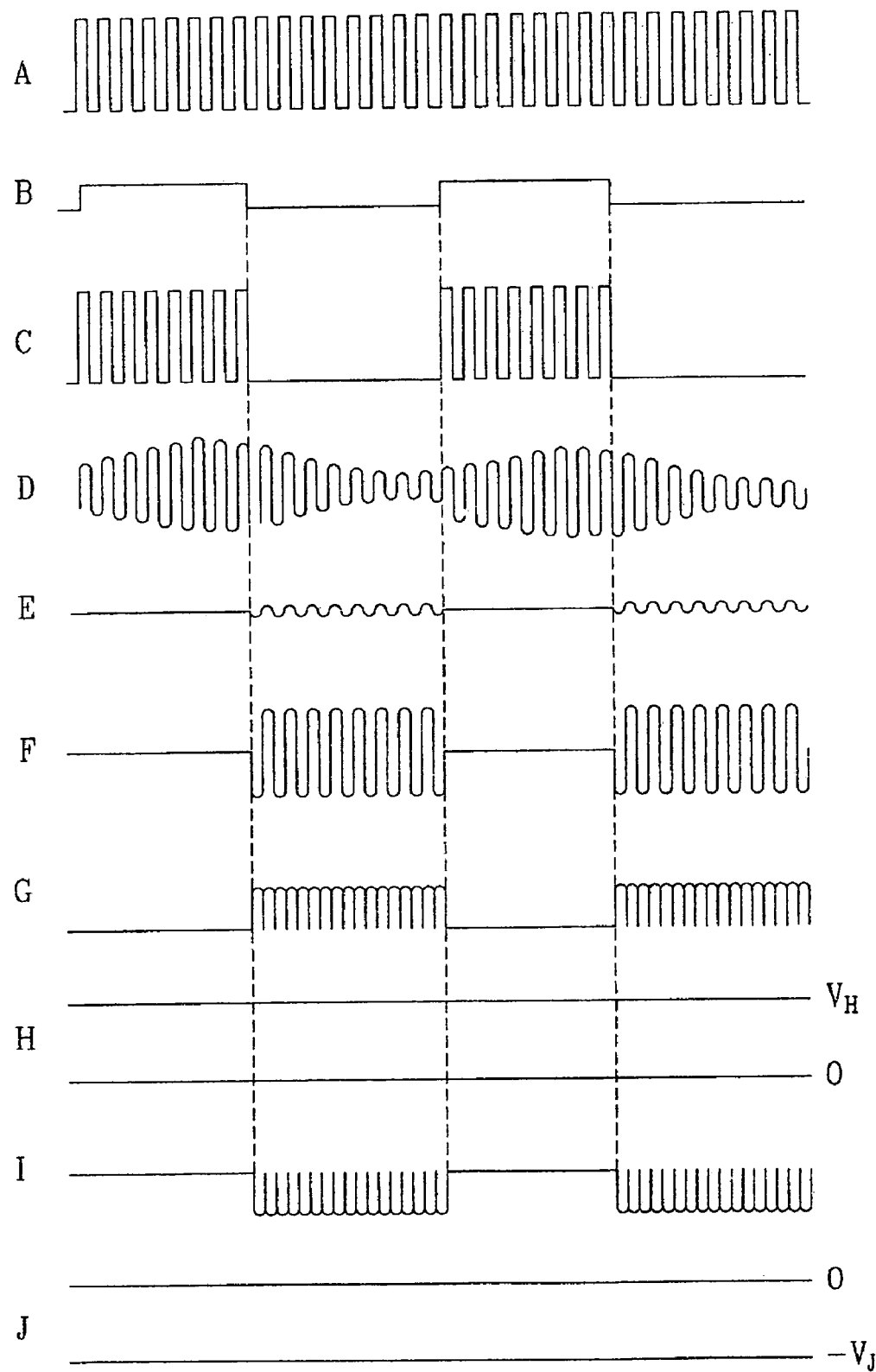
FIG. 7 illustrates waveform diagrams of the transmitting and receiving circuits shown in FIG. 6.

FIG. 7 illustrates waveform diagrams of the transmitting and receiving circuits shown in FIG. 6.

Referring to FIGS. 6 and 7, when electromagnetic fields are transmitted and received between the sensor array 10 and the stylus pen 700, a clock pulse having a predetermined frequency (e.g., 4 MHz), generated by the oscillator 41, may be divided by the frequency divider 42 into a plurality of frequencies having values ¼, ⅛, and 1/256 the predetermined frequency. Subsequently, a pulse signal, A, having the ⅛ divided frequency (e.g., 500 kHz) may be input to a first input terminal of the first NAND gate 43 and a transmitting-receiving switching signal, B, having the 1/256 divided frequency (e.g., 15.625 kHz) may be input to a second input terminal of the first NAND gate 43. Next, the pulse signal, A, and the transmitting-receiving switching signal, B, may be calculated and inverted by the second NAND gate 44 and outputted as output signal, C, for determining whether the pulse signal, A, is output at intervals of, for example, about 32 μsec. The driving circuit 46 then converts the output signal C to an average signal and transmits the average signal to the selected antenna coil 91 of the sensor array 10 via the connection switching circuit 30 and the select circuit 20. Accordingly, the selected antenna coil 91 may generate an electromagnetic field based on the output signal C.

When the stylus pen 700 is arranged (e.g., substantially perpendicular to the touch panel) within the perimeter of the selected antenna coil 91, the generated electromagnetic field excites the induction coil 61 of the stylus pen 700 to generate an induction voltage D, synchronized with the output signal C, wherein the current associated with the induction voltage D is stored by the capacitor 62. Next, the connection switching circuit 30 switches the electrical connection of the selected antenna coil 91 from the transmitting circuit 40 to the receiving circuit 50 in accordance with the transmitting-receiving switching signal B. After being electrically connected to the receiving circuit 50, the selected antenna coil 91 ceases to generate the electromagnetic field.

Accordingly, the current associated with the induction voltage D, and stored within the capacitor 62, may then be discharged by the induction coil 61 to inversely excite the selected antenna coil 91 connected to the receiving circuit 50. Accordingly, a current corresponding to the induction voltage D may be induced within the selected antenna coil 91 to generate a received signal E.

The received signal E then amplified by the amplifier 51, to generate an amplified signal F. The amplified signal F is then transmitted to the first and second phase detectors 52 and 53, respectively. In one aspect of the present invention, the first pulse signal A may be input to the first phase detector 52 as a detection signal. Accordingly, when the phases of the first pulse signal A and amplified signal F are the same, the amplified signal F is positively inverted, thereby generating a first inverted signal G. The first inverted signal G is then passed through a first low-pass filter 54 having a low cut-off frequency and converted to a first average signal H having a first voltage, $+V_H$. The first voltage $+V_H$ is then transmitted to the processing unit 70. In another aspect of the present invention, the first pulse signal A and a second pulse signal, having a frequency twice that of the first pulse signal A, may be input to the EXOR gate 45, wherein an output signal A' is generated. In one aspect of the present invention, frequency of the output signal A' may be equal to the frequency of the first pulse signal A. In another aspect of the present invention, the phase of the output signal A' shifted by 90° as compared to the phase of the first pulse signal A. Subsequently, the output signal A' may be input to the second phase detector 53 as a detection signal. When the phases of the output signal A' and the amplified signal F are the same, the amplified signal F is negatively inverted, thereby generating a second inverted signal I. The second inverted signal I is then passed through a second low-pass filter 55 having a low cut-off frequency and converted to a second average signal J having a second voltage $-V_J$. The second voltage $-V_J$ is then transmitted to the processing unit 70.

When a switch of the stylus pen 700 is turned off, the phase and frequency of the voltage corresponds to the phase and frequency of the stored current within the resonance circuit 701. As a result, the phase of the amplified signal F is equal to the phase of the first pulse signal A, and the first voltage $+V_H$ is generated by the first average signal H. When the switch of the stylus pen 700 is turned on, the phase of the current is shifted to the phase of the voltage at the predetermined angle. As a result, the phase of the amplified signal F is shifted to the phase of the output signal A' and the first and second voltages $+V_H$ and $-V_J$ are generated by first and second average signals H and J, wherein the voltage is generated by the second average signal J when the phase is shifted by 90°.

Received by the processing unit 70, the first and second average signals H and J are converted to digital signals and the contact point is calculated using equation (1):

$$Vx = (V^2_H + V^2_J)^{1/2} \tag{1}$$

$$V\theta = \tan^{-1}(V_J/V_H) \tag{2}$$

Vx represents the amplitude of a detected voltage value corresponding to the distance between the stylus pen 60 and the antenna coil 91, while Vθ represents the phase of the detected voltage value. When the stylus pen 93 and the antenna coil 91 are switched, the Vx value is converted, thereby enabling the location of the stylus pen 93 to be detected. That is, the voltage Vθ is varied according to switching on/off, so that the switching on/off state is checked in a process comparing the voltage Vθ to a predetermined threshold voltage.

According to principles of the present invention, a touch panel may be integrated with a display device wherein contact points may be determined using contact objects including a stylus, a user's finger, etc., thereby increasing the convenience of the touch panel and minimizing extra costs incurred by the user should the user lose their stylus.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A touch panel display, comprising:
a display device;
a capacitive-type touch panel arranged above the display device; and
an electromagnetic (EM)-type touch panel arranged below the display device, wherein the EM-type touch panel includes a sensor board arranged below the display device, wherein electromagnetic fields are generatable by the sensor board, and a control board arranged below and in electrical communication with the sensor board, wherein a location of a contact point generated by a contact object is determinable by the control board.

2. The touch panel display of claim 1, wherein the display device comprises an liquid crystal display (LCD).

3. The touch panel of claim 1, wherein the display device comprises a plasma display panel (PDP).

4. The touch panel of claim 1, wherein the display device comprises an electro-luminescent display (ELD).

5. The touch panel of claim 1, wherein the display device comprises a vacuum-fluorescent display (VFD).

6. The touch panel of claim 1, wherein the display device comprises a cathode ray tube (CRT).

7. The touch panel display of claim 1, wherein the capacitive-type touch panel is spaced apart from the display device by a predetermined distance.

8. The touch panel display of claim 1, wherein the capacitive-type touch panel includes:
a transparent electrode;
a plurality of metal electrodes arranged at corners of the transparent electrode; and
a passivation layer arranged over an entire surface of the transparent electrode and on the metal electrodes.

9. The touch panel display of claim 8, wherein the transparent electrode comprises indium-tin-oxide (ITO).

10. The touch panel display of claim 8, wherein the transparent electrode comprises tin-antimony-oxide (TAO).

11. The touch panel display of claim 8, wherein the metal electrodes comprise silver.

12. The touch panel display of claim 8, wherein the metal electrodes comprise a mixture of silver and glass.

13. The touch panel display of claim 1, wherein the control board includes:
a first driving part for driving the capacitive-type touch panel, wherein a capacitance value is detectable by the first driving part;
a second driving part for driving the EM-type touch panel, wherein an electromagnetic field is detectable by the second driving part; and
a third driving part for selectively switching between the first and second driving parts.

14. The touch panel display of claim 1, wherein the sensor board includes:
a sensor PCB;
a shield plate; and
a connector connecting the sensor PCB to the control board.

15. The touch panel display of claim 14, wherein the sensor PCB is connected to the shield plate by an adhesive.

16. The touch panel display of claim 1, further comprising a passivation layer arranged over the display device.

17. The touch panel display of claim 16, wherein the passivation layer is formed of an insulating material.

18. The touch panel display of claim 17, wherein the passivation layer includes silicon nitride.

19. The touch panel display of claim 17, wherein the passivation layer includes silicon oxide.

20. The touch panel display of claim 17, wherein the passivation layer includes Benzocyclobutene (BCB).

21. The touch panel display of claim 17, wherein the passivation layer includes acrylic resin.

22. The touch panel display of claim 1, further comprising a case top securing the display device, the capacitive-type touch panel, and the EM-type touch panel together as a single body.

23. The touch panel display of claim 22, wherein the case top is metal.

24. A touch panel display, comprising:
a display device;
a capacitive-type touch panel arranged above the display device;
an electromagnetic (EM)-type touch panel arranged below display device; and
a case top securing the display device, the capacitive-type touch panel, and the EM-type touch panel together as a single body, wherein the display device has a passivation layer disposed on a surface facing the capacitive-type touch panel.

25. The touch panel display of claim 24, wherein the case top is metal.

26. The touch panel display of claim 24, wherein the display device comprises an liquid crystal display (LCD).

27. The touch panel display of claim 26, wherein the LCD comprises:
an upper substrate;
a lower substrate bonded to the upper substrate;
liquid crystal material arranged between the bonded upper and lower substrates;
an upper polarizing plate adhered to an upper surface of the upper substrate;
a lower polarizing plate adhered to a lower surface of the lower substrate; and
a backlight arranged between the lower polarizing plate and the EM-type touch panel.

28. The touch panel display of claim 24, wherein the passivation layer is spaced apart from the upper polarizing plate by a predetermined distance.

29. The touch panel of claim 24, wherein the display device comprises a plasma display panel (PDP).

30. The touch panel of claim 24, wherein the display device comprises an electro-luminescent display (ELD).

31. The touch panel of claim 24, wherein the display device comprises a vacuum-fluorescent display (VFD).

32. The touch panel of claim 24, wherein the display device comprises a cathode ray tube (CRT).

* * * * *